United States Patent [19]
Denz et al.

[11] Patent Number: 4,465,043
[45] Date of Patent: Aug. 14, 1984

[54] REGULATING DEVICE FOR AN INTERNAL COMBUSTION ENGINE

[75] Inventors: Helmut Denz, Stuttgart; Hans-Peter Stumm, Tamm, both of Fed. Rep. of Germany

[73] Assignee: Robert Bosch GmbH, Stuttgart, Fed. Rep. of Germany

[21] Appl. No.: 326,092

[22] Filed: Nov. 30, 1981

[30] Foreign Application Priority Data

Dec. 23, 1980 [DE] Fed. Rep. of Germany ....... 3048626

[51] Int. Cl.³ .............................................. F02D 33/02
[52] U.S. Cl. ..................................... 123/327; 123/339; 123/588
[58] Field of Search ............... 123/339, 327, 352, 588, 123/585

[56] References Cited

U.S. PATENT DOCUMENTS 4,237,838 12/1980 Kinugawa et al. .................. 123/339
4,291,656 9/1981 Miyagi et al. ........................ 123/339
4,336,779 6/1982 Semence ............................. 123/585

*Primary Examiner*—Andrew M. Dolinar
*Attorney, Agent, or Firm*—Edwin E. Greigg

[57] ABSTRACT

A regulating device is proposed for an internal combustion engine having a throttle device and a controllable bypass channel in the intake tube, where regulation is effected to a minimum volume ($\dot{Q}/n$) in overrunning above a predetermined rpm value and to the idling rpm below this rpm value. The purpose of this regulating device is the substantially precise preliminary control of an adjustment member in the bypass channel around the throttle valve to the opening cross section required for idling. The regulating device includes a switchover device (alternating switch), to the input terminals of which the output signals of the regulators for volumetric value and for idling rpm are applied. In the case of temperature-dependent minimum and threshold volumetric values, good warmup performance can be attained.

13 Claims, 3 Drawing Figures

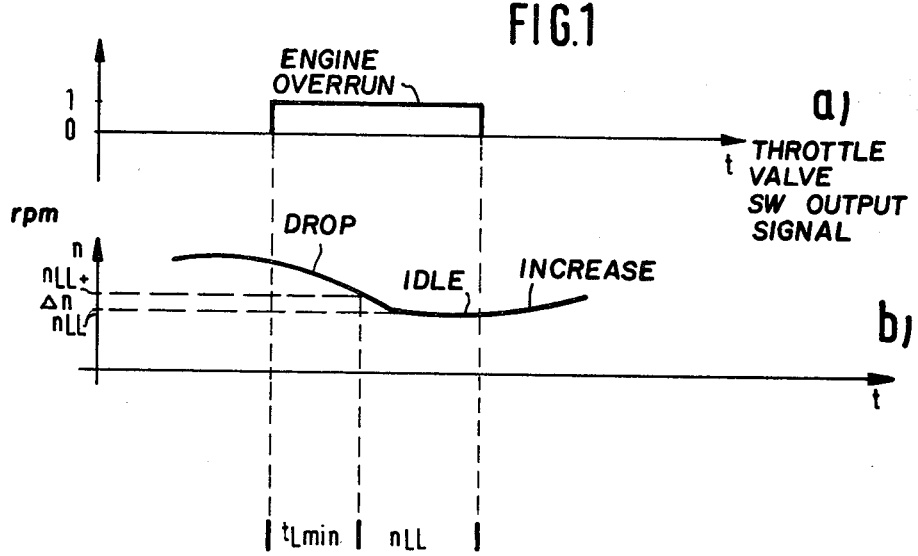
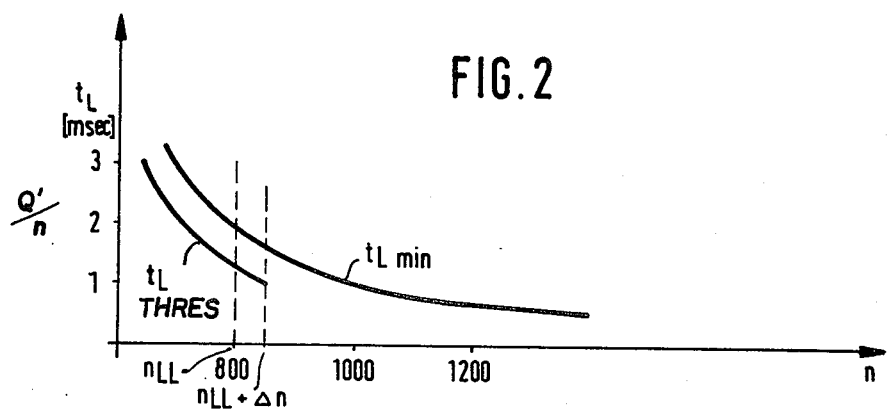

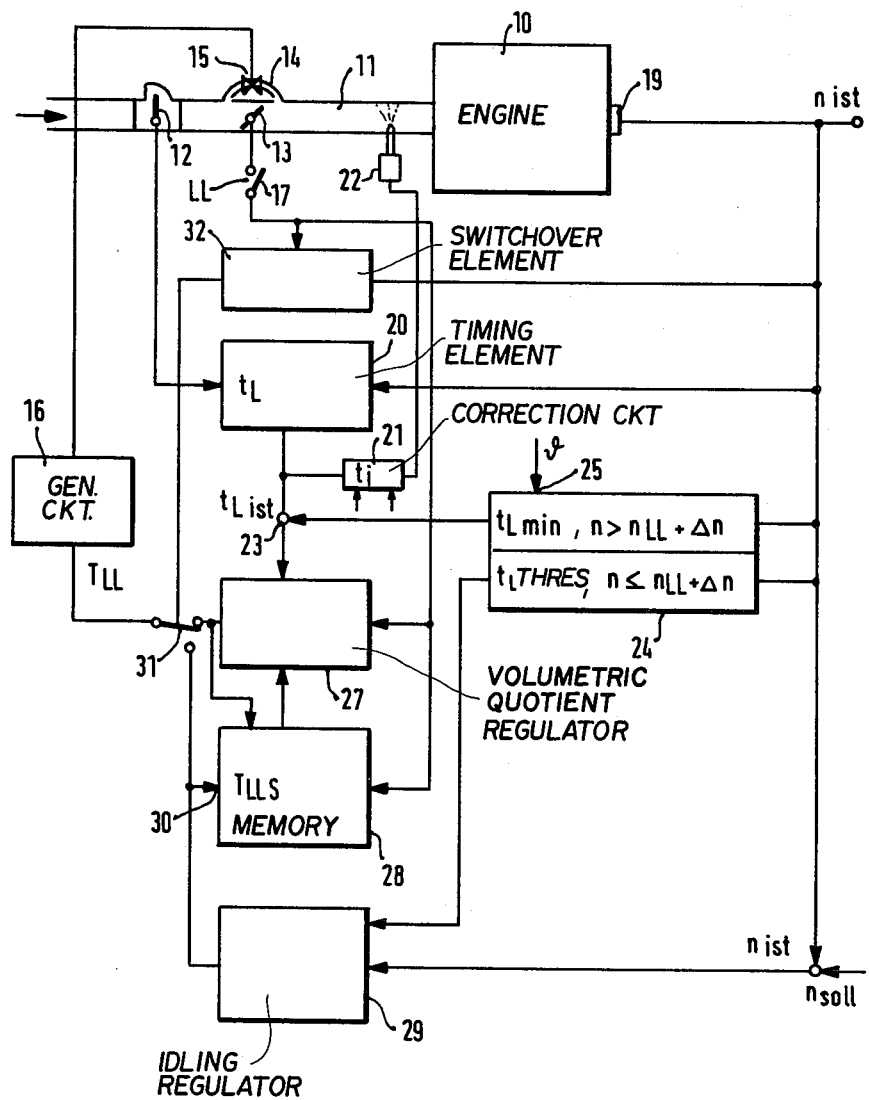

REGULATING DEVICE FOR AN INTERNAL COMBUSTION ENGINE

BACKGROUND OF THE INVENTION

The invention is based on an rpm regulating device for an internal combustion engine having a throttle device in the air intake tube and an associated controllable bypass as an air diversion channel. During idling, the cross section of this bypass channel can be varied in order to regulate rpm. In this known rpm regulating device, the bypass cross sectional opening has an average opening cross section outside the area of idling rpm regulation, from which point on the regulation is initiated.

It has been found that this known regulating device is not capable of providing satisfactory results in all cases, particularly in terms of favorable exhaust gas figures and additionally in providing sufficient protection against engine stalling.

OBJECT AND SUMMARY OF THE INVENTION

The regulating device according to the invention is for an internal combustion engine which, if engine overrunning is detected, for an rpm above a predetermined value, the volumetric quotient, that is, the ratio of air flow in the intake tube to engine rpm is minimized and idling regulation is initiated for an rpm below the predetermined value. The present device has the advantage over the prior art that it is possible to attain very precise preliminary control of the bypass channel cross section so that it matches the opening cross section required during idling. This is attained by regulating the load signal to match an rpm-dependent set-point value during overrunning. Temperature and voltage fluctuations and differences from one engine to another are prevented by this means from influencing the rpm regulation.

The invention will be better understood and further objects and advantages thereof will become more apparent from the ensuing detailed description of preferred embodiments taken in conjunction with the drawings.

BRIEF DESCRIPTION OF THE DRAWINGS

FIG. 1a is a pulse diagram of a throttle valve switch output signal;

FIG. 1b is a time diagram of the rpm signal;

FIG. 2 shows a minimal and a threshold load signal, plotted over the rpm, and finally, FIG. 3 is a block circuit diagram for the realization of the rpm regulating device of the present invention.

DESCRIPTION OF THE PREFERRED EMBODIMENTS

The following examples relate to regulating devices used with Otto engines—that is, with internal combustion engines having externally-supplied ignition.

FIG. 1 shows the output signal of a throttle valve switch and the rpm signal plotted over a specific operational range.

By definition, and as shown in FIG. 1a, a throttle valve switch, when closed, should emit a logical 1 signal. This signal value signifies the occurrence of engine overrunning. The resultant rpm course is shown by the curve in FIG. 1b. As shown, the rpm drops at the onset of overrunning, with a subsequent idling-rpm regulation phase, until after the throttle switch once again opens, when the rpm again increases as intended by the driver of the vehicle.

In a known fuel injection system for Otto engines, a basic injection time is formed which is proportional to the air throughput in the air intake tube $\dot{Q}$ and inversely proportional to the rpm. Expressed as a formula, this is $t_L = \dot{Q}/n$. This quotient is also known as the volumetric quotient value, and it may be used as a load signal for other variables to be computed, such as ignition values.

For every type of internal combustion engine, there are specific minimal $\dot{Q}/n$ values over the rpm. One example of this is given in FIG. 2. As shown, the $t_{Lmin}$ curve rises as the rpm decreases. This minimal-value curve stands for good driving comfort, while a $t_{Lthres}$ curve located lower on the graph marks absolute threshold values; if the curve drops below them, the engine is likely to stall.

In the present invention, the essence is that during overrunning, up to an rpm $n_{LL} + \Delta n$ (where $n_{LL}$ is idling rpm — $\Delta n$ designates a given tolerance value above the idling rpm), the opening of the bypass channel is regulated in accordance with the curve $t_{Lmin}$ of FIG. 2—and thus in accordance with a certain air throughput in the air intake tube—while below this rpm value, regulation is effected purely of the idling rpm. During this idling rpm regulation, however, the curve $t_{Lthres}$ seen in FIG. 2 also acts as a limiting factor, in order to prevent the complete closure of the idling adjustment member during the phase of idling rpm regulation and when the driver is pressing on the accelerator pedal. Otherwise, the engine might stall at the next transition back to idling.

If the throttle valve is once again opened as shown in FIG. 1a, then there is a new increase in rpm in accordance with the acceleration or velocity desired by the driver. It has proved to be efficacious for the trigger signal for the adjustment member in the bypass channel to be stored in memory at the instant of opening of the throttle valve, so that at the onset of the next overrunning phase the regulation need not be based on some extreme value of the adjustment member.

This positional fixing of the adjustment member furthermore has the advantage that as a result, the engine obeys the change in gas pedal position directly, without being influenced by the regulation of idling rpm, and what accordingly prevails is the driver's actual intention.

If after the throttle valve has opened the rpm drops below the set-point idling value as the result of a load (for example, from the engagement of a gear), then the regulation must likewise intervene and open the adjustment member further, so that the engine will not stall. If the rpm subsequently increases above $n_{LL} + \Delta n$, then the trigger signal of the adjustment member must be regulated downward, via a slow time function, from the instantaneous value to the most recent stored value from before the opening of the throttle valve. It is thereby assured that the adjustment member will not remain unintentionally widely open in the partial-load range.

In order to assure the best possible preliminary control during warmup, also taking into consideration the need for a temperature-dependent set-point rpm and an increased fuel requirement, the characteristic curves $t_{Lmin}(n)$ and $t_{Lthres}(n)$ may be realized in the form of performance graphs dependent on engine temperature.

One further advantage of the above-described rpm regulation is the ability to predetermine a minimal volume ($Q/n$) during overrunning at high rpm, and thus to effect a limitation of underpressure. With a view to favorable exhaust-emission figures during overrunning, this provision has proved to be extremely efficacious.

One possible realization of the above-described rpm regulation is shown in the form of a block circuit diagram in FIG. 3. The drawing includes an engine 10, an air intake tube 11, in which there are an air flow rate meter 12 and a throttle valve 13. A bypass channel 14 diverts air around the throttle valve 13. An adjustment member 15 enables a variation in the cross section of this bypass channel 14, and the trigger signal for this adjustment member 15 is derived from a signal-generator circuit 16. The throttle valve 13 has an associated switch 17, which in accordance with FIG. 1a emits a logical 1 signal when the throttle valve is closed. An rpm transducer 19 provides the individual signal-generator circuits of the engine with an rpm signal.

On the basis of an air throughput signal and an rpm signal, a $Q/n$ signal is formed in a timing element 20, which undergoes pulse length modulation in a correction circuit 21 in accordance with corrective variables and finally triggers an injection system 22 in the vicinity of the intake tube 11. The output pulses of the timing element 20 furthermore travel to a comparison point 23, in which the actual and set-point values for $t_L$ are compared. The set-point values corresponding to $t_{Lmin}$ and $t_{Lthres}$ are dependent on rpm and correspond to the curve types given in FIG. 2. With a view to a desired temperature dependence on the part of these set-point values, block 24 for the performance graphs also has an input 25 for a temperature signal. A $t_L$ regulator 27 receives input signals from the comparison point 23, the throttle valve switch 17 and a memory 28. The most recent $t_{LLS}$ value at a particular time before the opening of the throttle valve is retained in this memory 28. This value $t_{LLS}$ represents the initial value for the onset of the next overrunning phase; it is the most recent *memorized* $t_L$ value from the *preceding* overrunning phase, and it is also the initial value for the *next* overrunning phase when it occurs.

An idling regulator 29 receives an input signal from a comparison point for set-point and actual rpm values and is connected on the output side with one input 30 of the memory 28 as well as with one contact of an alternating switch 31. The second contact of this alternating switch 31 is connected to the output of the $t_L$ regulator 27.

The alternating switch 31 receives its signal to reverse direction from a regulator switchover logic element 32 in accordance with an rpm signal and with the position of the throttle valve switch 17. On the output side, the alternating switch 31 communicates with the signal-generator circuit 16 with the adjustment member 15 in the bypass channel 14 around the throttle valve 13.

In the illustrated position of the alternating switch 31, the apparatus according to FIG. 3 functions as a volumetric quotient regulator ($Q/n$). At the same time, this signifies an rpm value above $n_{LL}+\Delta n$. In other words, the curves shown in FIG. 2 are the criteria here. If the rpm falls below the threshold value $n_{LL}+\Delta n$, then the alternating switch 31 switches into its alternate position and the idling regulator 29 become effective.

The most recent value of $t_{LLS}$ of the $t_L$ regulator is automatically stored in the memory 28 upon the switchover of the switch 31.

The individual components of the block circuit diagram of FIG. 3 are known per se and do not present any difficulties to one skilled in the art of electrically controlled fuel metering.

In an efficacious manner, the adjustment member 15 is driven with control signals of modulated pulse length, whose pulse-duty factor is finally determined by regulators 27 and 29. As a result of this provision, the adjustment member 15 is adjustable in a finely graduated manner.

What is essential in the rpm regulating device described above is the substantially precise preliminary control of the adjustment member 15 to the opening cross section required during idling, which is effected by means of regulating the volumetric signal ($Q/n$) to an rpm-dependent set-point value during overrunning, and the retention during partial-load operation of the control signal applicable to idling. The present device detects and compensates for load reduction during engine overrun, idling or occurrence of low partial-load range. In this manner, it is also possible to preclude the influence of temperature or voltage fluctuations as well as of differences from one engine to another. Finally, the described rpm regulating device enables good adaptation of the preliminary control in the warmup phase and overall improvement of the exhaust gas during operation at minimum volume ($Q/n$) by limiting the minimum volume.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. In a regulating device for providing relief regulation in an internal combustion engine, having an intake tube, a throttle device therein, a means for detecting rpm (n), and means for controlling intake air flow, an idling regulator connected to said means for controlling intake air flow, and an engine overrun detection means, the improvement comprising, means for forming a volumetric quotient ($Q/n$) where Q is the air throughput in the intake tube, means for recognizing during engine overrun a threshold value of rpm, $n_{LL}+\Delta n$, where $n_{LL}$ is idle rpm and $\Delta n$ is a given tolerance value above idle rpm, means connected to said means for controlling intake air flow and said means for forming a volumetric quotient for regulating said volumetric quotient to a desired minimum rpm dependent value when rpm is above $n_{LL}+\Delta n$, and means responsive to an output of said recognition means for switching control of said means for controlling intake air flow from said regulating means to said idling regulator.

2. A regulating device as defined by claim 1, wherein said volumetric quotient is predetermined, regulation becoming effective on the occurrence of at least one of a load reduction during overrunning, during idling, and at a low partial-load range.

3. A regulating device as defined by claim 2, further comprising means for providing a control value for said means connected to said means for controlling intake an flow upon the occurrence of engine overrun which equals a control value memorized from a preceding occurrence of engine overrun.

4. A regulating device as defined by claim 3, wherein said means for controlling intake air flow is triggered via a means providing a signal of modulated pulse length.

5. A regulating device as defined by claim 2, wherein subsequent to a wide opening of said means for controlling intake air flow, the air quantity can be reduced via a control means to an earlier value indirectly in accordance with a specific time function.

6. A regulating device as defined by claim 2, further comprising means for selecting said desired minimum rpm dependent value and threshold values in accordance with temperature for controlling said intake air flow.

7. A regulating device as defined by claim 1, further comprising means for providing a control value for said means connected to said means for controlling intake air flow upon the occurrence of engine overrun which equals a control value memorized from a preceding occurrence of engine overrun.

8. A regulating device as defined in claim 7, wherein subsequent to a wide opening of said means for controlling intake air flow, the air quantity can be reduced via a control means to an earlier value indirectly in accordance with a specific time function.

9. A regulating device as defined by claim 7, wherein said means for controlling intake air flow is triggered via a means providing a signal of modulated pulse length.

10. A regulating device as defined by claim 1, wherein subsequent to a wide opening of said means for controlling intake air flow, the air quantity can be reduced via a control means to an earlier value indirectly in accordance with a specific time function.

11. A regulating device as defined by claim 10, wherein said means for controlling intake air flow is triggered via a means providing a signal of modulated pulse length.

12. A regulating device as defined by claim 1, further comprising means for selecting said desired minimum rpm dependent value and threshold values in accordance with temperature for controlling said intake air flow.

13. A method of regulating an internal combustion engine having a throttle device in an intake tube, an idling regulator for controlling intake air flow during idling, and rpm detection means; the steps including:

detecting means during engine overrun with the rpm detection means if rpm is above a threshold value of rpm of $n_{LL}+\Delta n$, where $n_{LL}$ is idle rpm and $\Delta n$ is a given tolerance value above idle rpm;

regulating the ratio of intake air-flow rate to engine rpm to a desired minimum rpm-dependent value when the rpm is above $n_{LL}+\Delta n$; and initiating regulation of rpm with the idling regulator upon detecting a value of rpm which is not above $n_{LL}+\Delta n$.

* * * * *